No. 771,674. PATENTED OCT. 4, 1904.
T. SLOPER.
FASTENING DEVICE FOR PNEUMATIC TIRES.
APPLICATION FILED MAR. 12, 1904.
NO MODEL. 4 SHEETS—SHEET 1.

No. 771,674. PATENTED OCT. 4, 1904.
T. SLOPER.
FASTENING DEVICE FOR PNEUMATIC TIRES.
APPLICATION FILED MAR. 12, 1904.
NO MODEL. 4 SHEETS—SHEET 3.
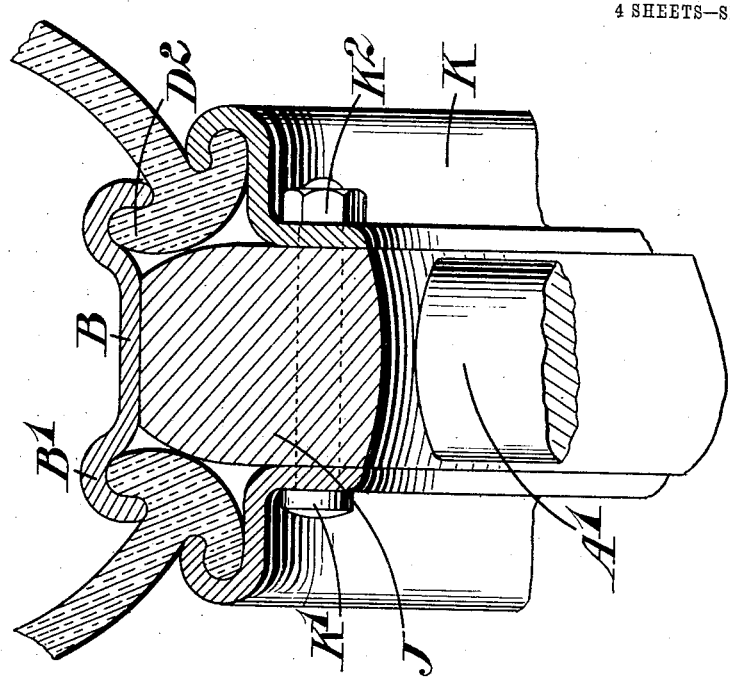
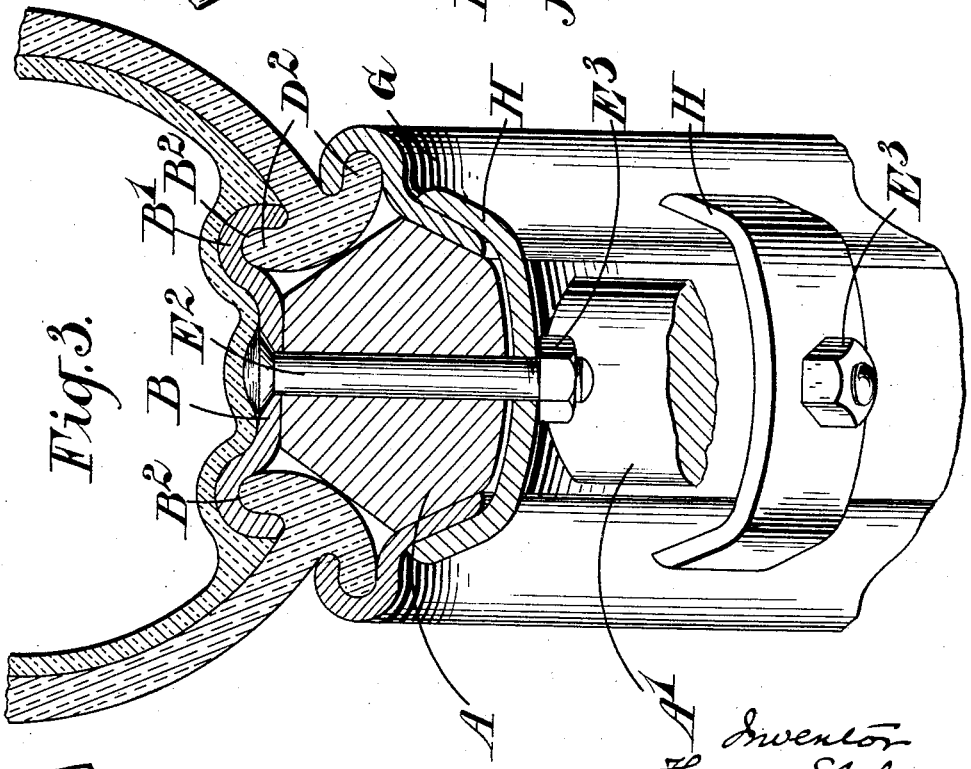

No. 771,674. PATENTED OCT. 4, 1904.
T. SLOPER.
FASTENING DEVICE FOR PNEUMATIC TIRES.
APPLICATION FILED MAR. 12, 1904.
NO MODEL. 4 SHEETS—SHEET 4.
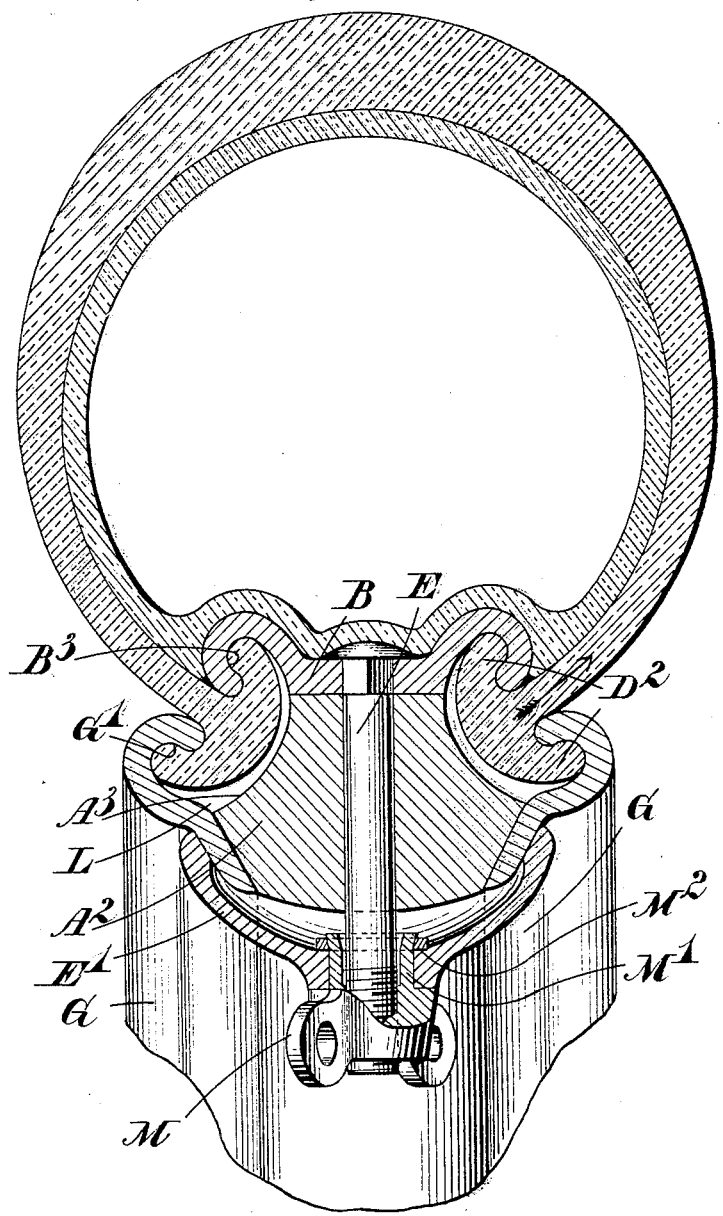

No. 771,674. Patented October 4, 1904.

UNITED STATES PATENT OFFICE.

THOMAS SLOPER, OF DEVIZES, ENGLAND, ASSIGNOR TO CHRISTIAN HAMILTON GRAY, OF SILVERTOWN, ESSEX COUNTY, ENGLAND.

FASTENING DEVICE FOR PNEUMATIC TIRES.

SPECIFICATION forming part of Letters Patent No. 771,674, dated October 4, 1904.

Application filed March 12, 1904. Serial No. 197,867. (No model.)

*To all whom it may concern:*

Be it known that I, THOMAS SLOPER, a subject of the King of England, residing at Devizes, Wiltshire, England, have invented certain new and useful Improvements in Fastening Devices for Pneumatic Tires, of which the following is a specification.

This invention relates to improvements in fastening devices for pneumatic tires, particularly those adapted for heavy loads, and has for its object to provide means by which the edges of the tire-cover may be secured to the wheel-rim by detachable side plates and a peripheral band without undue lateral strain being put upon the side plates when in use. The advantage of such an arrangement is that comparatively few fastening-bolts or the like need be used to secure the side plates, even if any are required, so that the tire may be quickly removed from the wheel-rim.

In the accompanying drawings, Figure 1 is a transverse section through a tire and wheel-rim, showing one form of fastening device constructed according to this invention. Fig. 2 is a similar view showing a slightly-modified construction. Fig. 3 is a similar view showing yet another construction. Fig. 4 is a similar view showing a further modification, and Fig. 5 is a similar view showing still another modification.

Like letters indicate like parts throughout the drawings.

The felly A of the wheel may be of any suitable material, that shown being wood, and according to the construction shown in Fig. 1 is of approximately hexagonal cross-section. The spokes A' enter the inner face of the felly, and to the opposed face, which constitutes the outer periphery of the felly, a metal band B is secured. The band extends laterally beyond the peripheral face of the felly, as shown at B', and each lateral projection is provided on its inner side with a groove $B^2$. Annular side plates C are situated one at each side of the felly, the inner face of the plates lying against those of the felly adjacent to the spoke-carrying face. These side plates extend beyond the faces of the felly against which they rest toward the projecting portions of the band B, and each projecting portion has a groove C' on that side toward the band B similar to the grooves $B^2$ in the band. The outer cover D D' is provided with a double bead $D^2$ at each edge, this double bead being adapted to lie in the space between the projecting portions of the band B and side plates C, and the beads are shaped to fit and occupy the grooves $B^2$ C'. The engaging faces of the bead—that is, those faces remote from the felly A'—lie at an acute angle to the face of the main fabric, and the engaging portions of the grooved band and side plates are correspondingly shaped, so that it will be seen that any pull upon the side of the cover would tend to draw the side plates and bead toward each other. Owing to this action, very little strain is put upon the side plates in a lateral direction—that is, tending to force them away from the felly of the wheel—so that these may be secured by a few clamps or bolts placed at intervals, which do not require much time to remove. In this figure transverse bolts E, secured by nuts $e$, are passed through side plates C and the felly A. To further render the fastening of the tire secure, wires or staples F may be inserted in the bead $D^2$ of the tire. The tire shown is built of cords D, looped at the edges in a known manner, the whole being embedded in rubber, and, if desired, between canvas, (indicated at D',) and the wires or staples F are placed through the looped ends of the cords, so that they form a secure anchorage and stiffening for the beads. The wires project beyond the edges of the band B and side plates C, so that they support the bead where engaged by these members and constitute part of the fastening device. They are preferably curved to correspond to the shape of the bead and "set up" at the center, as shown at F', so that the cords may lie in the set-up portion and not project beyond the edge of the tire.

In some circumstances it may be possible to dispense with the clamps or other fastenings employed for securing the side plates to the felly and the undercutting of the grooves and beads on the tire relied upon for keeping the side plates in place when the tire is inflated.

Referring to the construction in Fig. 2, which shows a slight modification in the construction of the means for securing the side plates in position, clamps are employed in place of the transverse bolts. These clamps are shown at E' each held in place by a bolt E², passed through the felly of the wheel and secured in place by a nut E³, screwed down upon the clamp. These bolts serve to hold the band B also in position. The clamps are curved plates which extend beyond the felly of the wheel and over the exterior of the side plates C, and they are preferably hollowed out for the sake of lightness on the under side and raised or embossed on the exterior to strengthen them, as clearly shown in the drawings.

Fig. 3 shows a slightly-modified construction of side plate G and clamping-plates H; but the action of this construction of fastening device is the same as that already described. The cross-section of the felly of the wheel in this construction is also slightly altered, the faces against which the side plates G rest being of less width than those toward the beads of the tire.

Fig. 4 shows a felly having the side plates K secured thereto by bolts and nuts K' K² and projecting at right angles from the felly. The projecting portions are then bent over to form the groove to receive the bead of the tire-cover, which is held in place as already described with reference to Fig. 1.

Figure 1:
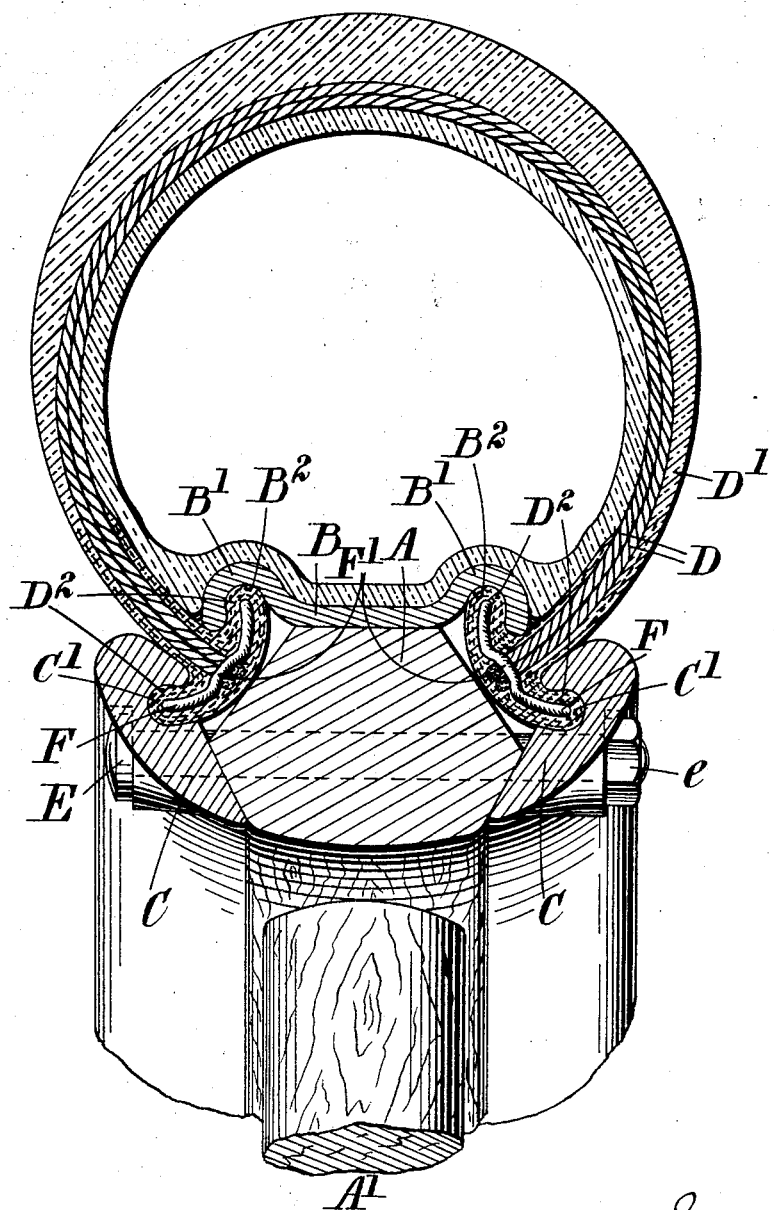
Figure 2:
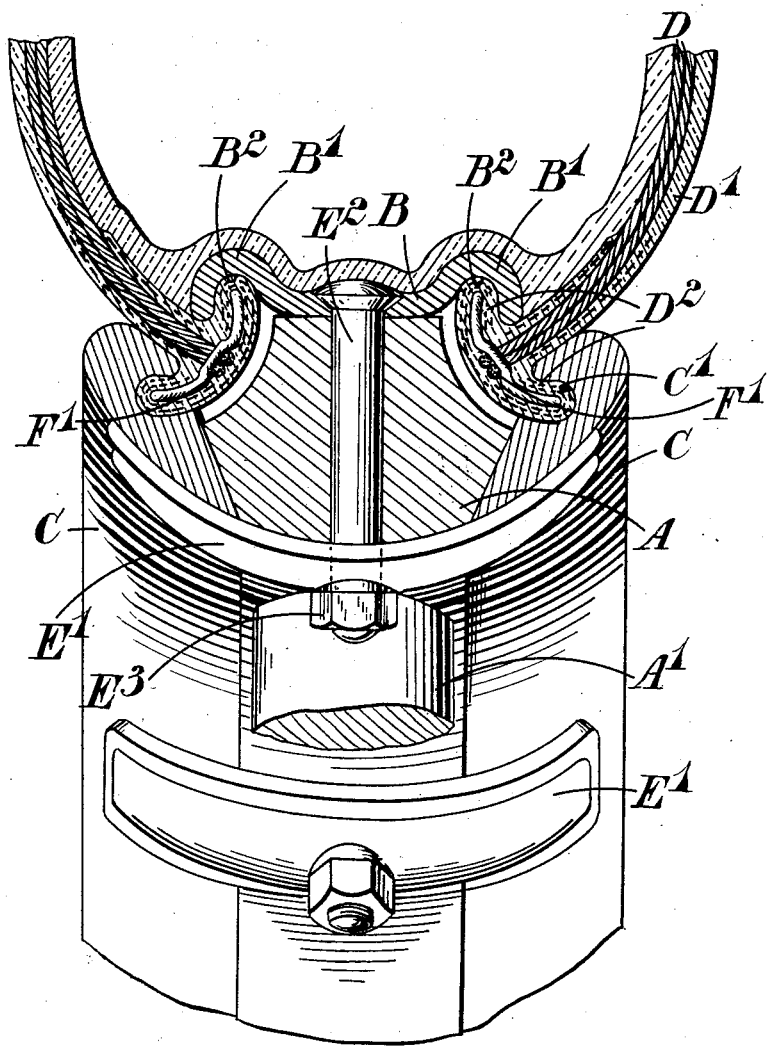

In Fig. 5 the groove in the band B is undercut on that face nearest the end of the band, as shown at B³, and each groove in the side plates G is similarly undercut on the face nearest the edge of the plate, as shown at G'. The double bead D² at each edge of the tire-cover is correspondingly shaped, so that the tendency to draw the side plates G and band B together when a strain is put upon the tire in the direction indicated by the arrow on the right-hand side of Fig. 5 is increased. When the side plates and band are undercut as described, it is found advisable to leave a greater space between the edge of the bead nearest the center of the wheel and the wheel-felly than need be left between that edge farther from the center of the wheel and the felly. This clearance is indicated at L. The clamps E' are again shown in this figure for holding the side plates G in place, and a device is shown by which the nuts securing the bolts E in position can be permanently secured to the clamp. Each nut is conveniently made in the form of a wing-nut M, although any other constructions may be employed, and it is provided with an extension M', which passes through an orifice in the clamp E'. The end of the extension is flared over on the inner side of the clamp and conveniently over a washer M², so that it cannot be withdrawn from the clamp, but is free to rotate therein. This device prevents the nuts from being lost; but it will be understood that any means for attaching the nuts to the clamps while permitting them to rotate freely may be employed.

It will be seen that with all of the constructions described, and particularly in that last described, the greater part of the lateral strain is taken by the band B, while the tendency to move either side at any point is counteracted because the bead on the tire engages the groove in the side plate throughout the whole of its circumference.

It is sometimes found advisable to secure one of the side plates to the wheel-rim, as there is a tendency for both plates to become detached when the tire is deflated and one plate removed. This may be effected by any convenient form of bolt or other fastening device, which does not constitute a part of this invention, and therefore need not be described.

Obviously many modifications may be introduced in the details of the fastening device described without departing from the spirit of the invention, which consists in so disposing the hooked or grooved projecting portions of the band and side plates relatively to the double bead of the tire-cover that undue lateral strain on the side plates is avoided.

What I claim as my invention, and desire to secure by Letters Patent, is—

1. In a tire-fastening device the combination of a wheel-felly, a metal band secured to the periphery of the felly and projecting laterally beyond the same, each lateral projection having a longitudinal groove on the inner side, detachable annular side plates one on each side of the felly and projecting from the same toward the lateral extensions of the peripheral band, these projecting portions having each a longitudinal groove on that side toward the band, a double bead to each edge of the tire-cover adapted to lie in the space between the felly and projecting portions of the band and side plates while the bead enters the grooves, and means for holding the annular side plates in position, substantially as set forth.

2. In a tire-fastening device the combination of a wheel-felly, a metal band secured to the periphery of the felly and projecting laterally beyond the same, each lateral projection having a longitudinal groove on the inner side, detachable annular side plates secured one on each side of the felly and projecting from the same toward the lateral projections on the peripheral band, these projecting portions having each a longitudinal groove on that side toward the band, and a double bead to each edge of the tire-cover adapted to lie in the space between the felly and projecting portions of the band and side plates while the bead enters and engages the grooves the engaging face of each half of the double bead being at an acute angle to the opposed face of the main fabric and the engaging portions of the grooved band and side plates being correspondingly shaped, substantially as described.

3. In a tire-fastening device the combination of a wheel-felly, a metal band secured to the periphery of the felly and projecting laterally beyond the same, each lateral projection having a longitudinal groove on the inner side undercut on that face nearest the edge of the band, detachable annular side plates secured one on each side of the felly and projecting from the same toward the lateral projections on the peripheral band, these projecting portions having each a longitudinal groove in that side toward the band and undercut on that face nearest the edge of the plate, and a double bead to each edge of the tire-cover adapted to lie in the space between the felly and projecting portions of the band and side plates while the bead enters the grooves which it is shaped to fit, substantially as set forth.

4. In a tire-fastening device the combination of a wheel-felly, a metal band secured to the periphery of the felly and projecting laterally beyond the same each lateral projection having a longitudinal groove on the inner side, detachable annular side plates secured one on each side of the felly and projecting from the same toward the lateral projections on the peripheral band, these projecting portions having each a longitudinal groove on that face toward the band, a double bead to each edge of the tire-cover adapted to lie in the space between the felly and projecting portions of the band and side plates while the bead enters and engages the grooves, the engaging face of each half of the double bead being at an acute angle to the opposed face of the main fabric and the engaging portions of the grooved band and side plates being correspondingly shaped, and clamping-plates detachably secured to the inner side of the felly and extending over the outside of the side plates for the purpose of retaining them in position, substantially as set forth.

5. In a tire-fastening device, the combination of a wheel-felly having an approximately hexagonal cross-section to one face of which the spokes are secured while the opposite face constitutes the periphery of the felly, a metal band secured to the peripheral face and projecting laterally beyond the same, each lateral projection having a longitudinal groove on the inner side, detachable annular side plates one on each of the faces of the felly adjacent to the spoke-carrying face and projecting beyond the same toward the lateral projections of the peripheral band these projecting portions having each a longitudinal groove on that face toward the band, a double bead to each edge of the tire-cover adapted to lie in the space between the felly and projecting portions of the band and side plates while the bead enters the grooves and means for securing the side plates to the felly of the wheel, substantially as set forth.

6. In a tire-fastening device, the combination of a wheel-felly having an approximately hexagonal cross-section to one face of which the spokes are secured while the opposite face constitutes the periphery of the felly, a metal band secured to the peripheral face and projecting laterally beyond the same, each lateral projection having a longitudinal groove on the inner side, detachable annular side plates one on each of the faces of the felly adjacent to the spoke-carrying face and projecting beyond the same toward the lateral projections of the peripheral band these projecting portions having each a longitudinal groove on that face toward the band, and a double bead to each edge of the tire-cover adapted to lie in the space between the felly and projecting portions of the band and side plates while the bead enters and engages the grooves, the engaging face of each half of the double bead being at an acute angle to the opposed face of the main fabric and the engaging portions of the grooved band and side plates being correspondingly shaped, substantially as set forth.

7. In a tire-fastening device the combination of a wheel-felly, a metal band secured to the periphery of the felly and projecting laterally beyond the same each lateral projection having a longitudinal groove on the inner side, detachable annular side plates one on each side of the felly and projecting from the same toward the lateral extensions of the peripheral band these projecting portions having each a longitudinal groove on that side toward the band, a double bead to each edge of the tire-cover adapted to lie in the spaces between the felly and projecting portions of the band and side plates while the bead enters the grooves, transverse stiffening-pins in the beading of the tire extending into those portions which enter the grooves and means for holding the annular plates in position, substantially as set forth.

8. In a tire-fastening device the combination of a wheel-felly, a metal band secured to the periphery of the felly and projecting laterally beyond the same, each lateral projection having a longitudinal groove on the inner side, detachable annular side plates one on each side of the felly and projecting from the same toward the lateral extensions of the peripheral band, these projecting portions having each a longitudinal groove on that side toward the band, a double bead to each edge of the tire-cover adapted to lie in the spaces between the felly and projecting portions of the band and side plates while the bead enters the grooves, transverse stiffening pins or staples in the bead or tire extending into those portions which enter the grooves, the pins being embedded in the substance of the cover, and means for holding the annular side plates in position, substantially as set forth.

In testimony whereof I have signed my name to this specification in the presence of two subscribing witnesses.

THOMAS SLOPER.

Witnesses:
FRANCIS W. BARRECLOUGH,
A. M. HAYWARD.